Jan. 25, 1944.   H. W. LORD   2,340,131
WELDING

Original Filed March 1, 1933

Inventor:
Harold W. Lord,
by Charles W. Mullor
His Attorney.

Patented Jan. 25, 1944

2,340,131

UNITED STATES PATENT OFFICE 2,340,131

WELDING

Harold W. Lord, Schenectady, N. Y., assignor to General Electric Company, a corporation of New York Application March 1, 1933, Serial No. 659,053
Renewed December 21, 1937

20 Claims. (Cl. 219—4)

My invention relates to improved electric valve circuits adapted for applying a substantially full half cycle of current from an alternating current source of supply to a translating device. The arrangement and organization of circuits in accordance with my invention is also such that current may be applied to a translating device for any desired portion of a half cycle. My invention is not limited, however, to controlling alternating current sources of supply, since it will function equally well in any circuit where the voltage of the source of current is periodically reduced to zero.

Improved electric valve circuits in accordance with my invention are particularly adapted for use in welding, and more particularly to that form of welding known as resistance welding in which the parts are united by pressure after the heat necessary to bring their surfaces to a welding temperature has been produced by the flow of electric current therethrough.

It is very desirable to make resistance welds and particularly spot welds, in as short a time as possible for several reasons, among which the following are the most important: high speed production, minimum oxidation or scaling, minimum distortion or warping, and minimum change in physical and chemical properties of the material welded.

I have already disclosed and broadly claimed in my application Serial No. 585,292, filed January 7, 1932, now Patent No. 2,253,129, dated August 19, 1941, for Circuit interrupters, and assigned to the same assignee as the present application, electric valve circuits by means of which it is possible to control very accurately the time of application of the welding current for periods as short as part of a cycle of a source of alternating current.

It is an object of my present invention to provide an improved circuit which is particularly adapted for half cycle welding and which can be adjusted for performing welding operations in periods less than one-half cycle.

It is a further object of my invention to provide apparatus which is cheap and simple.

Further objects of my invention will become apparent from a consideration of the following description of the two embodiments thereof diagrammatically illustrated in the accompanying drawing.

Figure 1:
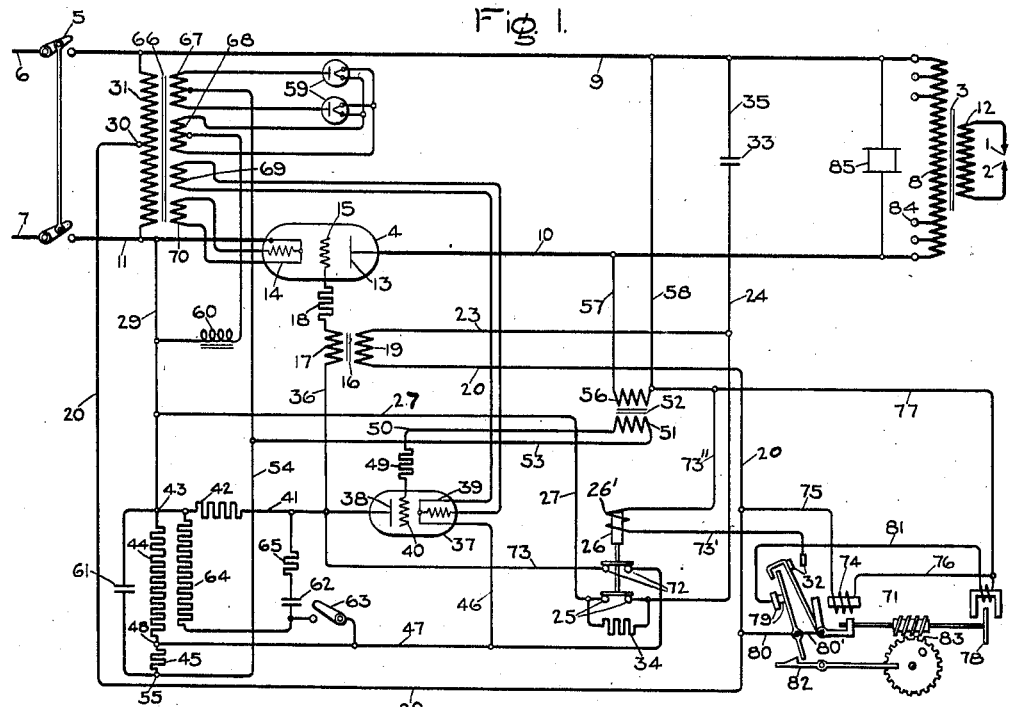
Figure 2:
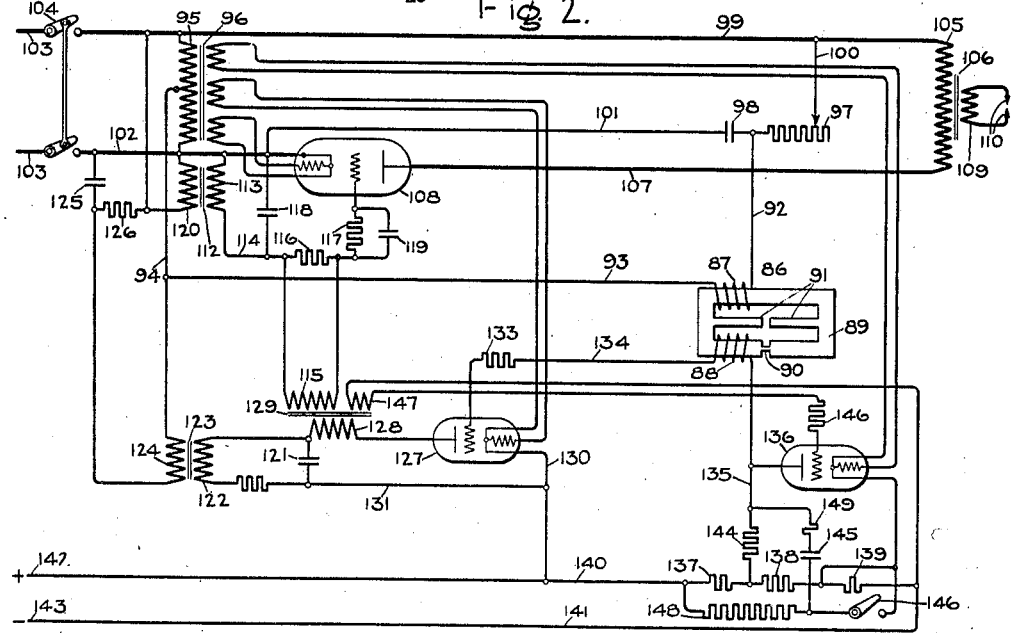

Fig. 1 of the drawing shows an arrangement in accordance with my invention which is adapted for half cycle welding, and Fig. 2 shows a modification of the arrangement illustrated in Fig. 1 by means of which the circuit is adapted for welding with currents of less than one-half cycle duration.

In the embodiment of my invention shown in Fig. 1 the transfer of energy between a supply circuit and a load circuit is controlled by electric translating apparatus comprising an electric valve including a control member for controlling its conductivity. More specifically, welding electrodes 1, 2, are connected through a welding transformer 3, an electric valve 4 and a switch 5 to a source of supply 6, 7. One terminal of the primary 8 of the welding transformer is connected through conductor 9 and switch 5 to terminal 6 of the source of supply and the other terminal of the primary 8 of the welding transformer is connected through a conductor 10, an electric valve 4, a conductor 11, and a switch 5 to the other terminal 7 of the source of supply. The secondary 12 of the welding transformer is connected to the electrodes 1 and 2. Alternating current is preferably used as the source of supply although any voltage periodically reduced to zero may be used.

The electric valve means may be of any suitable type although I prefer to use a vapor electric or arc discharge valve. Such valves comprise a cathode, a control element, usually referred to as a grid, an anode, and a small amount of inert gas or vapor. Current passes through the valve as an arc whose starting may be controlled by its control element or grid. The valve has a critical grid voltage and when the grid potential is below this critical value, i. e., more negative, no current will flow through the valve. After starting, however, the discharge cannot be further influenced by the grid but it can be stopped by removing the anode voltage. The operation of such a valve consists in periodically removing its anode voltage to stop the discharge and controlling its restarting by its grid. When an alternating current voltage is applied to such a valve, its grid can gain control once in each cycle and therefore can be used to prevent the flow of current when its anode again becomes positive.

In the drawing, the electric valve 4 is provided with an anode 13, a cathode 14, and a control member or grid 15. A control voltage derived from the welding circuit is applied to the grid 15 of the valve 4 through a transformer 16. The secondary 17 of this transformer is connected to the grid 15 through a current limiting resistance 18. The primary 19 of this transformer is connected to transformer winding 31 through conductors 20, 23 and 24, contacts 25 of relay 26, and conductors 27, 29 and 11, when the contacts 25 are closed. When the contacts 25 are open, the primary 19 of transformer 16 is connected through conductors 20 and 23 to a point on conductor 24 which is in a phase shifting circuit comprising condenser 33 and resistance 34. This phase shifting circuit is connected across conductors 9 and 11 through conductors 35, 24, 27 and 29. When relay 26 is deenergized and when contacts 25 are closed, the voltage applied to the grid 15 through transformer 16 lags the anode voltage by 180°, thus holding this valve off even before its grid is biased negatively by direct current from a rectifier circuit described below. Upon the energization of relay 26, contacts 25 are opened and the primary 19 of control transformer 16 is connected to the phase shifting circuit above referred to and a voltage is applied to the grid 15 of valve 4, which may lead its anode voltage a definite amount less than 180°.

A direct current bias voltage is also applied to the grid 15 of valve 4 through a conductor 36. This bias voltage is controlled by an electric valve 37 which, like electric valve 4, is preferably of the vapor electric type and is provided with an anode 38 and cathode 39 and a grid 40. Its anode 38 is connected through a conductor 41 and a resistance 42 to one terminal 43 of a potentiometer 44, 45, and its cathode 39 is connected through conductors 46 and 47 to the same potentiometer at 48. Its grid 40 is connected through a current limiting resistance 49, conductor 50, secondary 51 of transformer 52, and conductors 53 and 54 to terminal 55 of the potentiometer 44, 45. The primary 56 of transformer 52 is connected through conductors 57 and 58 to the welding circuit conductors 9 and 10.

Direct current is supplied by rectifier tubes 59 through a filter 60, 61, to the potentiometer 44, 45, the flow of current being such as to render terminals 43 and 55 respectively the positive and negative terminals of the potentiometer. With the connections thus derived, it will be noted that a direct current negative bias voltage is impressed on the grid 40 of valve 37 which is equal in amount to the drop across portion 45 of the potentiometer.

Valve 37 is commutated, that is, rendered non-conducting, by a condenser 62 and a control switch 63 by means of which the condenser 62 is connected across the anode and cathode of the valve. Charging and discharging resistances 64 and 65 are connected in circuit with the condenser 62.

The transformer 66, whose primary 31 previously referred to is connected across conductors 9 and 11, is provided with four secondaries. Two of these secondaries 67 and 68, are connected in the rectifier circuit. Secondary 68 is connected to the cathodes of the rectifiers and is employed to excite them while the secondary 67 is connected in the usual manner in the anode circuits of the rectifiers. The remaining two secondaries 69 and 70 of transformer 66 are connected to the cathodes 39 and 14 of valves 37 and 4 to furnish excitation thereto.

Cathode protection for valves 4 and 37 is obtained through a time delay relay 71 operating through relay 26 which has two sets of normally closed contacts 25 and 72. The contacts 72, when closed, short circuit the valve 37 through conductors 41, 73, 47, and 46, and the other set of contacts 25, when closed, short circuit resistance 34 in the phase shifting circuit above referred to, to complete the circuit of the primary 19 of control transformer 16 to tap 30 of transformer 66 and conductor 11, as described above. The voltage applied through transformer 16 to the grid 15 of valve 4 thus renders this valve non-conducting, or holds it off even before the grid is biased negatively by the direct current from the rectifier circuit, including the potentiometer 44, 45 through the circuit established through contacts 72 of relay 26. A definite time after closing the line switch 5, switch 71 closes its contacts 32 to energize the operating coil 26' of relay 26 through conductors 20, 80 and 80', contacts 32 and conductors 73', 73'', 77, and 58, by means of which it is connected to conductor 9 and tap 30 of transformer 66.

The time delay switch 71 diagrammatically represents a switch of the construction shown in United States Patent 1,699,125, Stephenson, January 15, 1929, assigned to the same assignee as the present application. Upon closing switch 5 its electromagnet 74 is energized by being connected through conductors 20, 75, 76, 77, and 58 to tap 30 of transformer 66 and conductor 9 of the welding circuit. The motor 78 is connected at the same time through contact 79 to tap 30 and conductor 9 through the following circuit: conductors 20, 80, 81, 77, and 58. Upon the energization of electromagnet 74 of relay 71, contacts 32 are biased to a closed position and contacts 79 to an open position, but contacts 32 are prevented from closing and contacts 79 are prevented from opening until latch 82 has been tripped through the action of motor 78 and gearing 83. Upon the tripping of latch 82, contacts 79 are allowed to open, thereby opening the circuit of the motor 78 and contacts 32 are allowed to close, thereby completing the operating circuit of coil 26' of relay 26, which has been described above. Upon the opening of switch 5 the parts of the relay 71 will assume the positions diagrammatically illustrated in the drawing in which contacts 32 are open and contacts 79 closed.

The primary 8 of the welding transformer may be provided with taps 84 in order to adjust the welding current applied to the electrode 1, 2. It is also desirable to protect the primary winding 9 against voltage surges by means of a spark gap or similar device 85.

The system will be better understood from a consideration of its operation which is as follows: Upon closing switch 5, the primary 8 of the welding transformer 3 is connected to the source of supply 6, 7, through the anode-cathode circuit of the electric valve 4 which is biased off or rendered non-conductive by the voltage applied to its grid 15 through the transformer 16 when relay 26 is in its deenergized position. This voltage lags the anode voltage of valve 4 by 180° and is derived through conductors 20, 23, 24, contacts 25, and conductors 27 and 29, by means of which primary 19 of transformer 16 is connected to tap 30 and of transformer 66 and conductor 11 to which one terminal of this transformer is also connected. The valve 37 is also short-circuited through the following circuit: conductors 41 and 73, contacts 72 and conductors 47 and 46. This short-circuit also applies a negative bias voltage to grid 15 of valve 4.

The closing of switch 5 also energizes the time delay relay 71. Its electromagnet 74 is connected to tap 30 of transformer 66 and conductor 9 of the welding circuit through the following circuit: conductors 20, 75, 76, 77 and 58. The electric motor 78 of the relay 71 is also connected to tap 30 and conductor 9 through the following circuit: conductors 20, 80, contacts 79, conductors 81, 77, and 58. Upon the energization of electromagnet 74, contacts 32 are biased to a closed position and contacts 79 to an open position, but contacts 32 are prevented from closing and contacts 79 prevented from opening by latch 82 which, after a predetermined time, is tripped by the motor 78 acting through gearing 83 of the relay 71 as more fully pointed out in the patent to Stephenson, above referred to. Upon the tripping of latch 82, contacts 32 are closed and contacts 79 are open. The opening of contact 79 deenergizes motor 78 of the relay 71 and the closing of contacts 32 energizes the operating coil 26' of relay 26 through the following circuit: from tap 30 of transformer 66 through conductors 20, 80 and 80', contacts 32, conductors 73', 73'', 77 and 58, to conductor 9 of the welding circuit. Relay 26, when energized, opens its contacts 25 and 72. The opening of contact 72 removes the short-circuit about the valve 37 and the opening of contacts 25 shifts the voltage applied to the grid 15 of valve 4 through transformer 16 to a value less than 180° leading its anode voltage. The opening of contacts 72 also removes the direct current bias voltage applied to grid 15 of valve 4 through conductors 36, 73, contacts 72, and conductor 47 by means of which the grid 15 is connected at 48 to potentiometer 44, 45.

The leading voltage applied to grid 15 of valve 4 is obtained by the connection of the primary 19 of control transformer 16 to the phase shifting circuit comprising condenser 33 and resistance 34 which is connected to conductors 9 and 11 through the following circuit: conductor 35, condenser 33, conductor 24, resistance 34, and conductors 27 and 29. The application of this control voltage to grid 15 of valve 4 through transformer 16 allows the valve 4 to fire for, as has been stated above, the direct current bias applied to the grid of this valve has been removed by the opening of the contact 72 around the valve 37.

The firing of valve 4 applies supply voltage through control transformer 52 to the grid circuit of valve 37 overcoming its bias and allowing it to fire and the firing of valve 37 connects resistance 42 in the following circuit: from terminal 43 of potentiometer 44, 45 through resistance 42, conductor 41, valve 37 and conductors 46 and 47 to connection 48 of the potentiometer. The drop across resistance 42 is thus applied as a negative bias to the grid 15 of valve 4, and is of sufficient magnitude to overcome the control voltage applied to transformer 16 and render valve 4 non-conducting when its anode voltage passes through zero. The circuit is now ready for operation.

From what has been said above, it will be noted that in the "off position" valve 37 is conducting and the grid 15 of valve 4 has impressed upon it a negative bias voltage equal to the drop across resistance 42. The grid 15 of valve 4 also has impressed upon it an alternating current voltage leading less than 180° the voltage applied to its anode.

With valve 37 conducting and control switch 63 open, the capacitor 62 is charged through resistance 64 and 65 and valve 37 to approximately the voltage drop across resistance 42 and of a polarity such that conductor 41 connected to the anode of valve 37 through resistance 65 is negative. The closing of control switch 63 connects the positively charged plate of the condenser to the cathode 39 of valve 37 and the anode 38 of this valve is pulled negative for a time long enough to commutate it. The presence of resistance 65 damps the circuit and prevents the natural inductance of the circuit from recommutating valve 37 when this valve is refired with 63 closed. Capacitor 62 then discharges through resistances 65 and 42 and recharges through these resistances to a reverse polarity.

When capacitor 62 has become nearly charged to this new polarity, the voltage drop across resistances 42 is low and thus valve 4 has practically no direct current bias. As the direct current bias on valve 4 approaches zero, a condition is finally reached whereby valve 4 is permitted to fire, but since the alternating current control voltage leads the anode voltage by less than 180°, for example 150°, this firing can take place only in the first 30° of the positive half cycle. Consequently, with a 150° or more lead, valve 4 fires for practically the full half cycle, or not at all.

It is desirable to have the control voltage applied through the transformer 16 lead the anode voltage of valve 4 as much as is economically possible so that the valve 4 will fire as early in the positive half cycle as possible, and will fire for practically the full half cycle or not at all. The firing of valve 4 applies the supply voltage 6, 7, to the primary 8 of the transformer 3 through conductors 9, 10, and 11, and welding current is supplied to the work parts between electrodes 1 and 2 through the secondary 12 of the transformer 3.

The firing of valve 4 refires valve 37 through voltage applied to its grid 40 through controlling transformer 52 and a high negative direct current bias voltage is again applied to the grid 15 and biases this valve off before the start of the next cycle of supply voltage.

Opening control switch 63 allows capacitor 62 to charge again to the correct polarity to commutate valve 37 when control switch 63 is again closed.

Switch 63 constitutes manual means for rendering the control circuit including condenser 33 and resistance 34 operative with respect to the control member 15 of electric valve 4 to render this valve conductive at a predetermined time during cycles of voltage of the alternating current circuit 6, 7. Furthermore, transformer 52 energized from the load circuit 9, 10 is in effect a timing means for controlling the interval of energization of the load circuit. This transformer 52 controls the conductivity of electric valve 37 which, when conductive, renders the control circuit previously referred to inoperative after the expiration of an interval of time.

The welding transformer 3 should be designed to prevent high excitation current with full half cycle applied voltage, that is, to prevent a substantial saturation of its core structure when connected to a source of periodic voltage at the beginning of a period and its leakage reactance should be reduced to a low value which will depend to some extent on the duty cycle of the transformer. The primary winding 8 should also be protected against surge voltages arcing over its windings. A properly adjusted spark gap material such as disclosed in Patent 1,822,742, K. B. McEachron, September 8, 1921, may be used.

If the phase shifting circuit of Fig. 1 is made adjustable, if a transformer generating a peaked voltage wave is employed for the controlling transformer 16, and if resistance 42 is connected to a tap on resistance 44 to provide a minimum negative bias voltage for the grid of valve 4, it is possible to adapt the circuit of Fig. 1 for operating periods less than a half cycle. The peaked voltage employed must be less than the maximum direct current bias voltage and greater than the minimum direct current bias voltage applied to the valve connected in the welding circuit so that this valve may be biased off upon the flow of welding current through it in accordance with the operation above described. By shifting the phase of the control voltage supplied to the grid of the valve in the welding circuit it is possible to initiate the flow of welding current at any time in the cycle.

In Fig. 2 I have illustrated at 86 a saturable inductive device suitable for generating a peaked voltage wave such as referred to above. This device is a transformer having primary and secondary windings 87 and 88 which are located on a core 89 having a restricted cross-section at 90 and a leakage circuit between its primary and secondary windings at 91. The restricted section of the core is made preferably of some material of high permeability and low and abrupt saturation value with regard to iron, such as Nicaloi, Permalloy, or the like. By reason of the construction employed, the voltage generated in the winding 88 by the application of alternating or periodic voltage to the winding 87 will have a peaked wave form such as desired for the control above referred to.

In the control circuit of Fig. 2, primary 87 of the transformer 86 is connected through conductors 92, 93 and 94 to a tap of the primary 95 of transformer 96 and to a phase shifting circuit comprising an adjustable resistance 97 and a condenser 98. This phase shifting circuit is connected by conductors 100 and 101 to conductors 99 and 102 between which the primary 95 of transformer 96 is also connected. Voltage is applied to this circuit from a source 103 through a switch 104.

The primary 105 of the welding transformer 106 is connected through switch 104 and conductors 99 and 107, valve 108, and conductor 102, to the source of supply 103. The secondary 109 of the welding transformer is connected to the welding electrodes 110.

A negative bias voltage is applied to the grid of valve 108 by a transformer 112 through its secondary 113, which is connected to conductor 102 and through conductor 114, transformer winding 115 and resistance 116 in parallel and current limiting resistance 117 to the grid of valve 108. Transformer winding 113 and current limiting resistance 117 are provided with by-pass condensers 118 and 119. The primary 120 of transformer 112 is connected to conductors 99 and 102 of the welding circuit.

A condenser 121 is connected to the secondary 122 of a transformer 123 whose primary 124 is connected to a phase shifting circuit comprising winding 95 of transformer 96, condenser 125 and resistor 126. The discharge of condenser 121 is controlled by an electric valve 127 which is connected across the condenser 121 through the primary 128 of the transformer 129 and conductors 130 and 131.

Valve 127 has a direct current bias voltage applied to its grid through current limiting resistance 133, conductor 134, secondary winding 88 of transformer 86 and conductor 135. The magnitude of the bias voltage is determined by the electric valve 136. This valve is associated with a potentiometer circuit comprising resistances 137, 138, and 139, which are connected by conductors 140 and 141 to the plus and minus terminals of a source of direct current supply 142 and 143. When electric valve 136 is conducting, a circuit is established through resistance 144 and valve 136 in parallel with resistance 138 and a negative bias corresponding to the voltage drop across resistances 137 and 144 is applied to the grid of valve 127. When valve 136 is commutated, however, by connecting condenser 145 to its terminals through a control switch 146 the circuit through resistance 144 and valve 136 is interrupted and the direct current bias applied to the grid of valve 127 is reduced to the drop across resistance 137. This bias is not sufficient to prevent the peak voltage generated in winding 88 of transformer 86 from firing valve 127.

The grid of valve 136 is connected through a current limiting resistance 146 and a secondary winding 147 of transformer 129 to the negative terminal of the source of direct current 143. Condenser 145 is charged and discharged through resistances 148 and 149. Suitable cathode protection should be provided for each of the valves employed in Fig. 2. This protection may be obtained by using a time delay relay as in Fig. 1 above described.

The operation of the circuit disclosed in Fig. 2 will now be described. Valve 136 is normally conducting, placing a bias voltage equal to the drop across resistances 137 and 144 on the grid of valve 127. Closing switch 146, however, commutates valve 136 through the agency of condenser 145 and interrupts the flow of current through resistance 144, thus reducing the bias voltage on the grid of valve 127 to the voltage drop across resistance 137. The peak voltage obtained in the secondary winding 88 of transformer 86 is greater than this bias voltage and occurs at such a point in the cycle that it will fire valve 127. The firing of valve 127 discharges condenser 121 through the primary winding 128 of transformer 129. The peaked voltage thus induced in the secondary winding 115 of transformer 129 fires valve 108 which then conducts current for the remainder of the cycle or period of applied voltage. The peaked voltage induced in the secondary winding 147 of transformer 129 also refires valve 136 by overcoming its bias voltage and a high negative bias voltage greater in amount than the maximum value of the peaked voltage wave derived from transformer 86 is again impressed upon the grid of valve 127, biasing it off so that it will not conduct again until valve 136 is again commutated by opening and then reclosing switch 136.

As has been noted above, the phase of the controlling voltage of peaking transformer 86 may be shifted by varying the amount of resistance 97 included in the phase shifting circuit. It is of course apparent that like adjustment could be obtained by varying the amount of capacity in this circuit.

The phase shifting circuit by means of which transformer 123 is connected to the source of supply is employed in order to cause the anode voltage of valve 127 to lead the anode voltage of valve 108 and thus provide a control voltage in proper phase to fire valve 108. If a direct current bias voltage is applied to the grid of valve 108, as in Fig. 1, the peak voltage generated in winding 88 of transformer 86 may be applied directly to the grid of the valve to control it and the system of Fig. 2 would then function in the same manner as in Fig. 1, described above. It is apparent that electric valve 127 may be included in the charging circuit of condenser 121 and the peaked voltage obtained during charging of the condenser used in place of the peaked voltage obtained upon discharging the condenser as described above.

When welding with currents of a half cycle or less than a half cycle duration, it is necessary to have considerably more pressure exerted on the welding electrodes than is usual for welding in longer times. When the time is reduced to a half cycle or less, the weld is made in such a short time that the melting of the material reduces the pressure to such an extent that sparking occurs at the electrodes unless there is ample pressure to ensure the desired pressure on the work.

When the welding time is reduced to a half cycle or less in duration, satisfactory welds may be made on stainless steels with minimum discoloration. The weld is made in so short a time that the surfaces of the metal in contact with the electrodes do not reach a temperature sufficiently high to affect the heat treatment of the metal. Any change in the heat treatment of stainless steel reduces its corrosion resisting properties and it is for this reason that it is desirable to weld stainless steel through the application of welding current for extremely short intervals of time such as are obtainable by employing the circuit connections above described. The high speed of welding obtained with the circuits above described also reduces oxidation, scaling and distortion or warping to a minimum. The welding times obtainable with these circuits is much less than can be obtained through mechanically operated switches and by using electric valves the loss of time from shut-downs for contactor repair incident to the use of prior switching equipment is greatly reduced. The life of an electric valve is many times longer than the life of a contact in a mechanical switch and the circuit containing such valves holds its calibration so well that practically no time is lost through shut-down for adjustments.

While I have shown and described certain embodiments of my invention, I do not desire to be limited to the exact arrangements shown and described, but seek to cover in the appended claims all those modifications which fall within the true spirit and scope of my invention.

What I claim as new and desire to secure by Letters Patent of the United States is:

1. Welding apparatus comprising a source of current the voltage of which is periodically reduced to zero, a welding transformer having no substantial core saturation when connected to said source for substantially full periods of the voltage thereof, means including an electric valve for connecting said transformer to said source, and means for rendering said valve conductive only for substantially full periods of the voltage of said source.

2. Welding apparatus comprising a source of alternating current, welding electrodes, means, including a vapor electric valve, for connecting said electrodes to said source, said valve having an anode, cathode and control element and having its anode-cathode circuit energized in accordance with the voltage of said source, means for rendering said valve conductive at any point in the positive half cycle of the alternating voltage applied to its anode-cathode circuit, and means for applying a bias voltage to the control element of said electric valve upon the flow of current through said electric valve.

3. Welding apparatus comprising a source of alternating current, welding electrodes, means, including an electric valve, for connecting said electrodes to said source, said valve having an anode, cathode and control element and having its anode-cathode circuit energized in accordance with the voltage of said source, means for applying to the control element of said electric valve a control voltage leading its anode-cathode voltage less than 180°, and means for applying to said control element a bias voltage greater than said control voltage upon the flow of welding current through the anode-cathode circuit of said electric valve to said electrodes.

4. Welding apparatus comprising a source of alternating current, a welding transformer having no substantial core saturation with full half cycle applied voltage, means including an electric valve provided with a control element for connecting said transformer to said source, means for applying to the control element of said electric valve a control voltage leading its anode-cathode voltage substantially 180°, and means for applying to said control element a bias voltage greater than said control voltage upon the flow of welding current through said electric valve to said transformer.

5. Welding apparatus comprising a source of alternating current, welding electrodes, means, including an electric valve, for connecting said electrode to said source, said valve having an anode, cathode and control element and having its anode-cathode circuit energized in accordance with the voltage of said source, means for applying to the control element of said electric valve a voltage leading its anode-cathode voltage less than 180°, means, including a second electric valve having a control element for applying a bias voltage to the control element of said first mentioned electric valve, means for applying a bias voltage to the control element of said second electric valve, means for overcoming the bias voltage of said second electric valve and for rendering said second electric valve conducting upon the flow of welding current to said electrodes through the anode-cathode circuit of said first mentioned electric valve, and means for subsequently rendering said second electric valve non-conducting.

6. Welding apparatus comprising a source of alternating current, welding electrodes, means, including an electric valve having a control element, for connecting said electrodes to said source, a circuit including a condenser, means, including another electric valve having a control element, for charging and discharging said condenser, means for applying a bias voltage to the control element of said first electric valve, means for connecting said control element of said first electric valve to the circuit including said condenser, means for controlling the magnitude of the bias voltage applied to the control element of said second electric valve, means for applying a peaked voltage wave to the control element of said second electric valve, means for reducing the magnitude of said bias voltage on the control element of said second electric valve to a value less than the maximum value of said peaked voltage wave, means for adjusting the phase relationship of said peaked voltage relative to the voltage applied to said first electric valve, and means for increasing the bias voltage on the control element of said second electric valve to a value greater than the value of said peaked voltage wave upon the flow of current through said second electric valve.

7. Welding apparatus comprising a source of alternating current, welding electrodes, means, including an electric valve having a control element, for connecting said electrodes to said source, a circuit including a condenser, means for charging said condenser, means, including a second electric valve having a control element, for discharging said condenser, means for applying a bias voltage to the control element of said first electric valve, means for connecting said control element of said first electric valve to the discharge circuit of said condenser, means for controlling the magnitude of the bias voltage applied to the control element of said second electric valve, means for applying a peaked voltage wave to the control element of said second electric valve, means for reducing the magnitude of said bias voltage on the control element of said second electric valve to a value less than the maximum value of said peaked voltage wave, means for adjusting the phase relationship of said peaked voltage relative to the voltage applied to said first electric valve, and means for increasing the bias voltage on the control element of said second electric valve to a value greater than the value of said peaked voltage wave upon the discharge of said condenser.

8. Welding apparatus comprising a source of alternating current, welding electrodes, means, including an electric valve having a control element, for connecting said electrodes to said source, a circuit including a condenser, means for charging said condenser, means, including a second electric valve having a control element, for discharging said condenser, means for applying a bias voltage to the control element of said first electric valve, means for connecting the control element of said first electric valve to the discharge circuit of said condenser, means for applying a peaked voltage wave to the control element of said second electric valve, means for applying a bias voltage to the control element of said second electric valve less in amount than the maximum value of said peaked voltage wave, means, including a third electric valve having a control element, for increasing the bias voltage on the grid of said second electric valve to a value greater than the value of said peaked voltage wave, means for applying a bias voltage to the control element of said third electric valve, means for overcoming said bias voltage on the control element of said third electric valve upon the discharge of said condenser, and means for adjusting the phase relationship of said peaked voltage wave to the voltage applied to said first electric valve.

9. An electric valve circuit comprising a source of current the voltage of which is periodically reduced to zero, a transformer having no substantial core saturation when connected to said source for substantially full periods of the voltage thereof, means including an electric valve for connecting said transformer to said source, and means for rendering said electric valve conductive only for substantially full periods of the voltage of said source.

10. An electric valve circuit comprising a source of alternating current, a translating device, means, including an electric valve, for connecting said translating device to said source, said valve having an anode, cathode and control element and having its anode-cathode circuit energized in accordance with the voltage of said source, means for applying to the control element of said electric valve a control voltage leading its anode-cathode voltage substantially 180°, and means for applying to said control element a bias voltage greater than said control voltage upon the flow of current through the anode-cathode circuit of said electric valve to said translating device.

11. An electric valve circuit comprising a source of alternating current, a translating device, means, including an electric valve, for connecting said translating device to said source, said valve having an anode, cathode and control element and having its anode-cathode circuit energized in accordance with the voltage of said source, means for applying to the control element of said electric valve a voltage leading its anode-cathode voltage less than 180°, means, including a second electric valve having a control element, for applying a bias voltage to the control element of said first-mentioned electric valve, means for applying a bias voltage to the control element of said second electric valve, means for overcoming the bias voltage of said second electric valve and for rendering said second electric valve conducting upon the flow of current to said translating device through the anode-cathode circuit of said first-mentioned electric valve, and means for subsequently rendering said second electric valve non-conducting.

12. An electric valve circuit comprising a source of alternating current, a translating device, means, including an electric valve having a control element, for connecting said translating device to said source, a circuit including a condenser, means, including an electric valve having a control element, for charging and discharging said condenser, means for applying a bias voltage to the control element of said first electric valve, means for connecting said control element of said first electric valve to the circuit including said condenser, means for controlling the magnitude of the bias voltage applied to the control element of said second electric valve, means for applying a peaked voltage wave to the control element of said second electric valve, means for reducing the magnitude of said bias voltage on the control element of said second electric valve to a value less than the maximum value of said peaked voltage wave, means for adjusting the phase relationship of said peaked voltage relative to the voltage applied to said first electric valve, and means for increasing the bias voltage on the control element of said second electric valve to a value greater than the value of said peaked voltage wave upon the flow of current through said second electric valve.

13. An electric valve circuit comprising a source of alternating current, a translating device, means, including an electric valve having a control element, for connecting said translating device to said source, a circuit including a condenser, means for charging said condenser, means, including a second electric valve having a control element, for discharging said condenser, means for applying a bias voltage to the control element of said first electric valve, means for connecting the control element of said first electric valve to the discharge circuit of said condenser, means for applying a peaked voltage wave to the control element of said second electric valve, means for applying a bias voltage to the control element of said second electric valve less in amount than the maximum value of said peaked voltage wave, means, including a third electric valve having a control element, for increasing the bias voltage on the control element of said second electric valve to a value greater than the value of said peaked voltage wave, means for applying a bias voltage to the control element of said third electric valve, means for overcoming said bias voltage on the control element of said third electric valve upon the discharge of said condenser, and means for adjusting the phase relationship of said peaked voltage wave to the voltage applied to said first electric valve.

14. An electric valve circuit comprising a source of alternating current, a translating device, means, including an electric valve, for connecting said translating device to said source of alternating current, said valve having an anode, cathode and control element and having its anode-cathode circuit energized in accordance with the voltage of said source, means for rendering said electric valve conductive at any point in the positive half cycle of the alternating voltage applied to its anode-cathode circuit, and means for applying a bias voltage to the control element of said electric valve upon the flow of current through said valve.

15. An electric valve circuit comprising a source of alternating current, a translating device, means, including an electric valve, for connecting said translating device to said source, said valve having an anode, cathode and control element and having its anode-cathode circuit energized in accordance with the voltage of said source, means for applying a bias voltage to the control element of said electric valve, means for applying to the control element of said electric valve a control voltage of sufficient magnitude to overcome said bias voltage and render said electric valve conducting, and means responsive to the flow of current through the anode-cathode circuit of said electric valve for applying to the control element of said electric valve a second bias voltage sufficiently greater in magnitude than said first bias voltage to render said control voltage ineffective for rendering said electric valve conducting.

16. An electric valve circuit comprising a source of alternating current, a translating device, means, including an electric valve, for connecting said translating device to said source, said valve having an anode, cathode and control element and having its anode-cathode circuit energized in accordance with the voltage of said source, means for applying a bias voltage to the control element of said electric valve, means for applying to the control element of said electric valve a peaked voltage wave of sufficient magnitude to overcome said bias voltage and render said electric valve conducting, means for adjusting the phase relationship of said peaked voltage wave to the voltage applied to said electric valve, and means responsive to the flow of current through the anode-cathode circuit of said electric valve for applying to the control element of said electric valve a second bias voltage sufficiently greater in magnitude than said first bias voltage to render said peaked voltage wave ineffective for rendering said electric valve conducting.

17. An electric valve circuit comprising a source of alternating current, a translating device, means, including an electric valve, for connecting said translating device to said source, said valve having an anode, cathode and control element and having its anode-cathode circuit energized in accordance with the voltage of said source, means for applying a bias voltage to the control element of said electric valve, means for applying to the control of said electric valve a control voltage sufficient in magnitude to overcome said bias voltage and render said electric valve conducting, means, including a second electric valve having a control element, for increasing the bias voltage on the control element of said first electric valve to a value greater than the value of said control voltage, means for applying a bias voltage to the control element of said second electric valve, and means for overcoming bias voltage on the control element of said second electric valve upon the flow of current through the anode-cathode circuit of said first electric valve.

18. In combination, an alternating current circuit, a load circuit, electric translating apparatus connected between said circuits and comprising electric valve means for controlling the transfer of energy therebetween, said electric valve means including a control member for controlling the conductivity of the electric valve means, a control circuit comprising means for producing a periodic voltage, manual means for rendering said means operative with respect to said control member to render said electric valve means conductive at a predetermined time during cycles of voltage of said alternating current circuit, timing means energized from said load circuit for controlling the interval of energization of said load circuit, and means energized from said timing means for rendering said control circuit inoperative after the expiration of said interval of time.

19. In combination, an alternating current supply circuit, a load circuit, electric translating apparatus connected between said circuits and comprising electric valve means having a control member for controlling the conductivity thereof, a saturable inductive device comprising a secondary winding for impressing thereon a periodic voltage of peaked wave form and including a primary winding, means for energizing said primary winding, and means connected across said secondary winding to control the number of impulses of voltage of peaked wave form impressed on said control member to effect energization of said load circuit for a corresponding interval of time.

20. In combination, an alternating current circuit, a load circuit, electric translating apparatus connected between said circuits and comprising electric valve means for controlling the transfer of energy therebetween, said electric valve means including a control member for controlling the conductivity of the electric valve means, a control circuit comprising means for producing a periodic voltage, manual means for rendering said means operative with respect to said control member to render said electric valve means conductive at a predetermined time during cycles of voltage of said alternating current circuit, means energized from said load circuit for controlling the interval of energization of said load circuit, and means energized from said controlling means for rendering said control circuit inoperative after the expiration of said interval of time.

HAROLD W. LORD.